United States Patent
Wolff

(10) Patent No.: US 9,653,050 B2
(45) Date of Patent: May 16, 2017

(54) MECHANICALLY FASTENED DIAPHRAGMATIC GUITAR PLECTRUM RETAINER

(71) Applicant: Efram Benjamin Wolff, Vashon, WA (US)

(72) Inventor: Efram Benjamin Wolff, Vashon, WA (US)

( * ) Notice: Subject to any disclaimer, the term of this patent is extended or adjusted under 35 U.S.C. 154(b) by 0 days.

(21) Appl. No.: 14/579,492

(22) Filed: Dec. 22, 2014

(65) Prior Publication Data
US 2016/0314768 A1    Oct. 27, 2016

(51) Int. Cl.
*G10D 3/16* (2006.01)
*F16M 13/02* (2006.01)

(52) U.S. Cl.
CPC .............. *G10D 3/163* (2013.01); *F16M 13/02* (2013.01)

(58) Field of Classification Search
CPC .......... G10D 3/163; G10D 3/00; G10D 13/06; G10D 3/16; G10D 13/003; G10D 3/146; G10D 1/005; G10D 3/04; G10D 3/08; G10D 3/06; G10D 13/08; G10D 1/00; G10D 1/08; G10D 1/085; G10D 3/043; G10D 3/14
USPC ............ 248/223.41, 224.51, 224.61, 225.11; 84/320, 322
See application file for complete search history.

(56) References Cited

U.S. PATENT DOCUMENTS

| 5,488,892 | A  | * | 2/1996  | Jepsen   | G10D 3/163 84/322    |
|-----------|----|---|---------|----------|----------------------|
| D439,602  | S  | * | 3/2001  | Morris, Jr. | D17/20            |
| 7,626,103 | B1 | * | 12/2009 | Phillips | G10D 3/163 84/320    |
| 8,201,788 | B2 | * | 6/2012  | Carnevali | F16B 5/0635 248/223.41 |
| 8,389,857 | B2 | * | 3/2013  | Petrillo | H05B 37/0272 174/50  |
| 9,089,191 | B1 | * | 7/2015  | Farnum   | A44C 9/0061          |
| 2015/0255050 | A1 | * | 9/2015 | Diaz Lopez | G10D 3/163 84/322 |

* cited by examiner

*Primary Examiner* — Steven Marsh
(74) *Attorney, Agent, or Firm* — Svendsen Legal, LLC.

(57) ABSTRACT

The Improved Guitar Plectrum Retainer of the present invention is mechanically fastened to bracketing in the pickguard location.
The intended use of the present invention is to provide ease in alternating between plectrum and non plectrum techniques. The location and design of the improved retainer facilitate that ease of transition.
When wishing to insert the plectrum into the retainer the practitioner need only contact the elongated cover of the retainer with the tip of the plectrum and slide the plectrum along the inner surface of the cover.

10 Claims, 2 Drawing Sheets

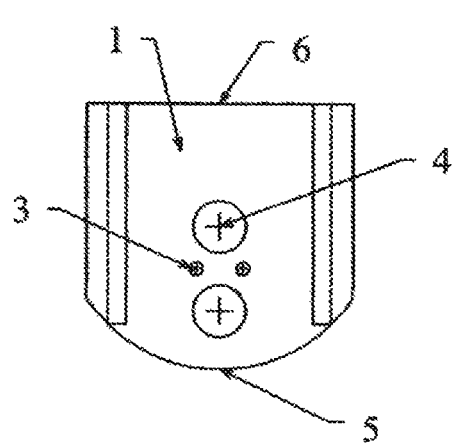
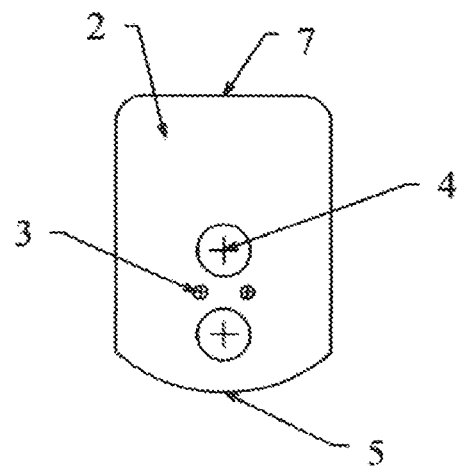
Fig. 1
Fig. 2
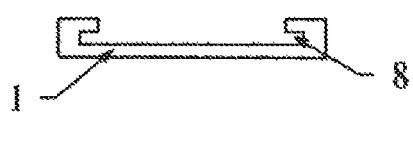
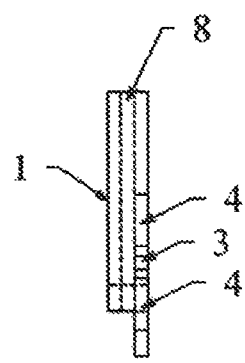
Fig. 3
Fig. 4

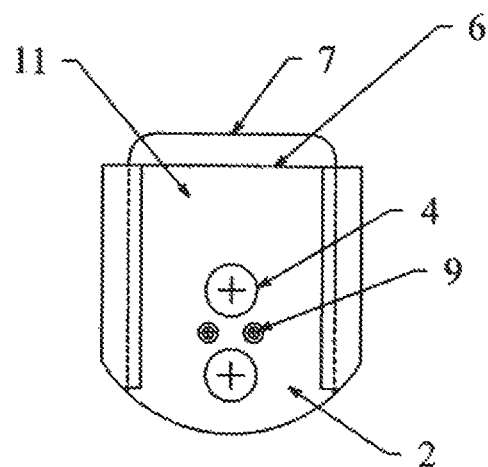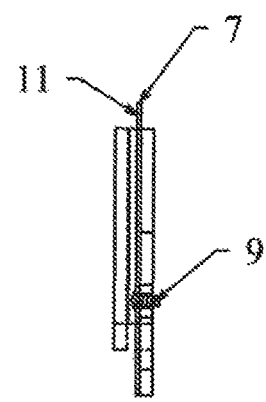
Fig. 5  Fig. 6
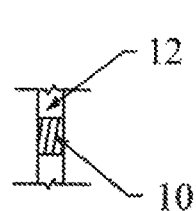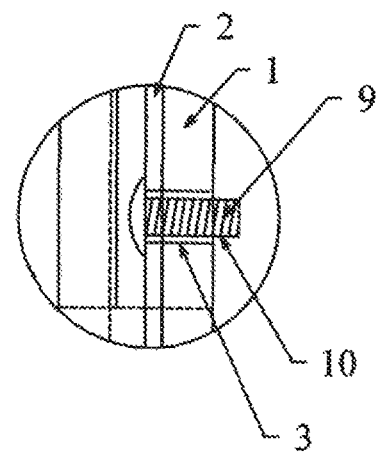
Fig. 7  Fig. 8

MECHANICALLY FASTENED DIAPHRAGMATIC GUITAR PLECTRUM RETAINER

TECHNICAL FIELD OF THE INVENTION

The present invention relates to the use of a plectrum in the playing of a steel string guitar. Specifically it is a retainer for a plectrum which allows the instrumentalist to alternate between finger and plectrum techniques.

BACKGROUND OF THE INVENTION

The plectrum, also referred to as a flat pick, is a triangular object of various sizes and patterns. Initially these were fashioned from tortoise shell, presently plastic is the primary material used. Musicians who play the steel string guitar have diverse picking, plucking and strumming techniques. These include using the fingers and thumb or using a plectrum. When alternating between these techniques a location where the instrumentalist can deposit the plectrum until needed is paramount.

The plectrum retainer of the present invention is mechanically fastened to bracketing. The bracketing is fastened to the guitar at the instrument's pickguard location. Acoustic and electric guitars from diverse periods of manufacture typically have a pickguard. The pickguard, fashioned from sheet plastic and on occasion wood, is used as both a finger rest and a shield to prevent marring the face of the guitar. Many types of acoustic and electric guitars have the pickguard held in place above the face of the instrument by brackets.

Solid body electric guitars often have the pickguard directly attached to the face of the instrument by wood screws. The pickguard area is a readily accessible location for the placement of the present invention. This location allows for a minimal interruption in the production of music when transitioning between techniques.

BRIEF DESCRIPTION OF THE DRAWINGS

FIG. 1 shows a preferred embodiment of a housing for use as part of the present invention, front view;

FIG. 2 shows a preferred embodiment of a cover for use as part of the present invention, front view;

FIG. 3 shows a preferred embodiment of a housing for use as part of the present invention from a top view, in cross section;

FIG. 4 shows a preferred embodiment of a housing for use as part of the present invention from a side view, in cross section;

FIG. 5 shows a preferred embodiment of the retainer of the present invention, front view;

FIG. 6 shows a preferred embodiment of the retainer of the present invention from a side view, in cross section;

FIG. 7 shows a preferred embodiment of the holes drilled and tapped in bracketing for the assembly and mounting of the present invention;

FIG. 8 shows a preferred embodiment of the mounting and assembly of the present invention in an enlarged view.

Reference characters included in the above drawings indicate corresponding parts as discussed herein. The description herein illustrates preferred embodiments of the invention. However, the description herein is not to be construed as limiting the scope of the invention in any manner. It should be understood that the above listed FIGS. are not necessarily to scale, and details that are not necessary for an understanding of the present invention by one skilled in the technology of the invention, or render details difficult to perceive, may have been omitted.

DETAILED DESCRIPTION OF SPECIFIC EMBODIMENTS

The Housing of the Improved Retainer

In a preferred embodiment of the present invention, the housing 1 is shown in FIGS. 1, 3, 4 and 8. The housing, as integral to the retainer, is shown in FIGS. 5 and 6. Plastic is the preferred material for the housing, although wood or aluminum could be substituted. The preferred plastic for the housing is extruded polystyrene. As shown in the views of the housing 1 in FIGS. 1, 3 and 4, a C channel is fabricated by extruding or machining according to the material employed. In the preferred embodiment wherein extruded polystyrene is used the two pair of holes 3 and 4, FIGS. 1 and 4 and the profile of the perimeter 5 and 6 FIG. 1 are cut using a laser. The smaller pair of holes 3, FIGS. 1 and 4 are the retainer assembly and mounting holes, the larger pair of holes 4, FIGS. 1 and 4 provide access for attaching bracketing to the guitar.

The Cover of the Improved Retainer

In a preferred embodiment of the present invention the cover 2, FIG. 2, is fabricated from transparent Polycarbonate. In a preferred embodiment the inner surface of the cover is coated with a protective hardcoating which minimizes it's scarification from use. The cover is cut to a width which will allow it to slide into the channels of the housing. The width of the cover, the two pair of holes 3 and 4, FIG. 2 and the perimeter 5 and 7, FIG. 2 are cut using a laser. The outer surface of the cover 11, FIGS. 5 and 6 is printed with an opaque ink. The ink is visible on both surfaces of the transparent cover. In assembly the cover is inserted into the channel of the housing 8, FIGS. 3 and 4. The tongue of the cover 7, FIGS. 2, 5 and 6 protrudes beyond the top perimeter of the housing 6, FIGS. 1 and 5. The protruding tongue provides both a tactile and an optical target for the tip of a plectrum in order to insert the plectrum into the retainer.

The housing and the cover have two pair of corresponding holes cut into them 3 and 4, FIGS. 1, 2, 4, and 5. The two larger holes 4 FIGS. 1, 2, 4, and 5 permit access to fasteners for mounting bracketing 12 to the guitar. The two smaller holes 3 FIGS. 1, 2, 4 and 8 align with those shown as 10, FIG. 7. Two holes 10, FIG. 7 are tapped to each accept a machine screw 9, FIGS. 5, 6 and 8. The two machine screws pass through the cover, then the housing and thread into the tapped holes 10, FIGS. 7 and 8, which have been provided in bracketing 12. The size and spacing of the two tapped holes is integral to the assembly and fastening of the Retainer of the present invention and does not vary according to bracketing 12.

Two Machine Screws 9, FIGS. 5, 6, and 8 fasten the plectrum retainer of the present invention to bracketing and fasten the cover to the housing.

The top of the retainer is open and is the point of insertion for the plectrum. The location of the two machine screws at the bottom of the retaining diaphragm creates a gradation in tension between the cover and the housing. The gradation in tension between the housing and the cover allows the retainer of the present invention to accept plectrums of diverse shapes and weights. The narrowed gap in the proximity of the two machine screws grips the plectrum preventing it from being dislodged. The open top of the retainer is less taut which facilitates the ease of installation and of removal of the plectrum.

The Use of the Improved Plectrum Retainer

The guitarist inserts the plectrum into the improved retainer, FIGS. 5 and 6, by contacting the protruding tongue of the cover with the tip of the plectrum and sliding the plectrum into the space between the cover and the housing. In order to remove the plectrum one simply takes hold of it and extracts it from the retainer. The secure mounting and placement of the improved retainer provide the guitarist with a superior solution when alternating between techniques. Having a second plectrum at the ready and plectrum storage when not playing the instrument are auxiliary uses of the present invention.

The following is claimed:

1. A retainer for use with a guitar plectrum, the retainer comprising:
   a housing, the housing fabricated from a channel material and a cover;
   a flat and flexible cover nesting within a channel of the housing;
   a lower perimeter of the housing and the cover are nominally equal;
   an upper perimeter of the cover extending past that of the housing;
   the cover and the housing each having a pair of aligning clear holes;
   the pair of aligning clear holes each having a pair of machine screws passing through them and the retainer secured mechanically to tapped holes in a bracketing; and
   the bracketing located in a pickguard area of a guitar.

2. The retainer of claim 1 consisting of a housing and cover which are plastic materials.

3. The retainer of claim 1 consisting of:
   a housing and a cover; and
   the cover including a transparent material, and the cover coated with an ink on an outer surface of the cover, with the ink visible on the inner surface of the cover.

4. The retainer of claim 1, wherein the housing is fabricated of extruded polystyrene.

5. The retainer of claim 1, wherein the cover is fabricated of a polycarbonate.

6. The retainer of claim 1, for holding one plectrum.

7. The retainer of claim 1, wherein the cover has a diaphragmatic cover.

8. The retainer of claim 1, wherein there are two access holes for attaching the bracketing to the pickguard area of the guitar.

9. The retainer of claim 1, wherein the cover and housing are assembled and attached to the bracketing mechanically.

10. The retainer of claim 9, wherein the bracketing to which the retainer has been attached is fastened to the pickguard area of the guitar.

* * * * *